United States Patent
Shimomura et al.

(10) Patent No.: US 6,428,414 B1
(45) Date of Patent: Aug. 6, 2002

(54) METHOD FOR REPRESENTING CHARACTER, STORAGE MEDIUM, IMAGE DISPLAY DEVICE, AND VIDEO GAME DEVICE

(75) Inventors: Satoshi Shimomura; Moriku Kubo, both of Tokyo; Atsushi Suzuki, Hoya, all of (JP)

(73) Assignee: Konami Co., Ltd., Hyogo-ken (JP)

( * ) Notice: Subject to any disclaimer, the term of this patent is extended or adjusted under 35 U.S.C. 154(b) by 0 days.

(21) Appl. No.: 09/266,595

(22) Filed: Mar. 11, 1999

(30) Foreign Application Priority Data

Oct. 8, 1998 (JP) .......................................... 10-287124

(51) Int. Cl.[7] ................................................ A63F 9/24
(52) U.S. Cl. ........................... 463/31; 463/35; 345/419; 434/99
(58) Field of Search .............................. 463/1, 7–8, 30, 463/31, 36, 40, 42, 35, 32; 434/236–238, 308, 99, 81, 98; 345/418–419, 428, 619, 625, 626, 629, 636, 637, 646, 649, 664, 665, 666, 473; 348/552

(56) References Cited

U.S. PATENT DOCUMENTS 4,539,585 A * 9/1985 Spackova et al.
5,807,174 A * 9/1998 Fukuhara et al. ............. 463/31
5,830,065 A * 11/1998 Sitrick ......................... 463/31

OTHER PUBLICATIONS

Diablo Manual, by Blizzard Entertainment, pp. 5–6, 11–15, 19, 22, 28–29, 36, 40–41, 78–79 plus box cover pages, Dec. 1996.*

Diablo product information from PC Game Review (2 pages) and Link to Official Site of Diablo game (3 pages).*

Ultima Online product information from PC Game Review with Screen shots (4 pages).*

* cited by examiner

*Primary Examiner*—Mark Sager
(74) *Attorney, Agent, or Firm*—Sughrue Mion, PLLC

(57) ABSTRACT

In character representation whereby an actual or imaginary character is represented electronically, naked body image data showing the state of the character when not carrying or wearing any equipment at all is previously prepared, and furthermore, item image data showing the state of an item of equipment when it is applied to the naked body image data is previously prepared for each type of equipment item. When an item of equipment to be worn or carried by the character is selected, the naked body image data is composed with item image data corresponding to the item of equipment selected at the item of equipment selection state, and the composed data is displayed.

18 Claims, 22 Drawing Sheets

METHOD FOR REPRESENTING CHARACTER, STORAGE MEDIUM, IMAGE DISPLAY DEVICE, AND VIDEO GAME DEVICE

BACKGROUND OF THE INVENTION

This invention relates to a video game device and a video game programs to be executed by a processing unit in cooperation with a display device for displaying an image of an appearance image of a character, and more particularly, it relates to the display of characters, such as human beings, animals or fictional characters, which appear in a video game.

Conventionally, there exist a variety of techniques for representing characters appearing in a video game.

One example of such a technique is a method wherein the capabilities and the states of a character are represented by combining a plurality of numerical values. For example, capabilities, such as strength, agility, endurance, charisma, knowledge, intelligence, etc., and physical and psychological states, such as height, weight, physical and mental fatigue, etc., are expressed by numerical values and attributed to each character individually, these numerical values being reflected in the actions performed by the character and producing different results in each character. Moreover, by altering these numerical values as the game progresses, it is possible to represent temporal changes in any particular character, for example, increases in capabilities as the character grows.

There also exist methods whereby the state of a character is represented by a list of the items in the character's possession, or of items of equipment being carried or worn by the character. This method involves displaying which items the character possesses, and which of those items the character is equipped with.

In many cases, these methods are combined in order to display a character in combination with the capability values and possessed items relating to that character. In this case, the capability values for the character are revised according to the items that the character is equipped with.

Yet a further method for representing a character involves displaying an appearance image of the character. For example, such a method may involve displaying the appearance image of the character in a state where the character is wearing clothing that is most symbolic of its role, and displaying the current position of the character on a map, or it may involve displaying a top-half image of the character, on a screen which displays the current state of a particular character to the player. This type of method may also be combined with representation based on capability values and possessed items.

In conventional methods for representing a character, the appearance image of a character displayed on an image does not alter, even if the items of equipment being carried or worn by the character change. This is because in conventional games, items of equipment are only regarded as being important with respect to revisions to the capability values, but changes in the appearance image of a character due to changes in the items of equipment carried or worn by the character are ignored, as is the effect of the appearance image of the items being carried or worn by the character on the psychological state of the character.

However, in the case of actual human beings, tastes with regard to clothes vary between each person, and therefore if someone is forced to wear clothes that do not particularly suit their own tastes, that person will be affected psychologically and emotionally. In conventional character representation methods, it has not been possible to represent human psychology of this kind.

SUMMARY OF THE INVENTION

Therefore, it is an object of the present invention to provide a method for displaying a character, a program for displaying the appearance image of a character, and an image display device, whereby displayed appearance image of a character changes in accordance with different items of equipment carried or worn by the character, and moreover, changes caused by the psychological state of the character in response to the different items with which the character is equipped can also be represented.

In order to achieve the aforementioned object, the present invention provides a method, an image display program, and an image display device for displaying an appearance image of a character equipped with a item, as described below.

According to this invention, the method for displaying, on an image display device, an appearance image of a character equipped with at least one item, comprises a preparing step of preparing reference character image data representative of a reference state image of the character free from any item and item image data representative of images of items to be equipped by the character, a selecting step of selecting the at least one item from the item image data, a composing step of composing the reference character image data and at least one item image data selected to provide a composed image data, and a displaying step of displaying composed image data as the appearance image. The reference character image data may show the whole body of the character is decided into a plurality of part image data each of which shows a part of body of the character. The top-half image of the character may be displayed in the displaying step.

Further, this method may comprises a step of designating a portion of the composed image data displayed in the displaying step, and a step of displaying the enlarged image of the portion on the image display device.

The character may have a set of numeral values each of which depends on a specific attribute of the character. In this case, the item has correctional values for modifying the numeral value set.

the correctional values may represent the magnitude of the effect imparted to the character equipped with the item.

In order to display appearance images of a plurality of characters, each of the characters is displayed by the method.

The set of numeral values may be grouped into a subset of numeral values each of which is indicative to a psychological parameter related to a psychological condition of the character. In this case, the psychological parameter may represent a degree of a friendship between the character.

The preparing step may prepare a plurality of background image data and the displaying step may display selected one of the background image data in accordance with the psychological parameter.

For example, the character is of the video game program in which actions of the character are commanded by an input device. In this case, the number of actions available for commanding may depend on the psychological parameters of the character. Further, the correctional values may depend on the number of times that the video game program is finished.

The preparing step may prepare sound source data each of which is linked to a part of the appearance image of the character. In this case, the displaying step comprise a step of designating a portion of the composed image data displayed in the displaying step and a step of reproducing the sound source data linked to the designated portion.

For example, the items comprise clothing, accessories, and portable weapons.

Further, according to this invention, the image display program, to be executed by a processing unit in cooperation with a display device for displaying an image of an appearance image of a character, includes a selecting process of selecting at least one item to be equipped by the character, an accessing process of accessing reference character image data representative of a reference state image of the character free from any item and item image data representative of images of the selected items, a composing process of composing the reference character image data and at least one item image data selected to provide a composed image data, and a displaying process of displaying composed image data as the appearance image. The reference character image data may show the whole body of the character is divided into a plurality of part image data each of which shows a part of body of the character.

Furthermore, according to this invention, the image display device, for displaying an image of an appearance image of a character, comprises a storage device which stores reference character image data representative of a reference state image of the character free from any item and item image data representative of images of items to be equipped by the character, means for selecting an item of which item image data is stored in the storage device, means for composing the reference character image data and the item image data corresponding to selected items, and means for creating a sequence of signals for displaying a screen image from the composed image by the means for composing. The reference character image data may show the whole body of the character is divided into a plurality of part image data each of which shows a part of body of the character. A video game device may comprise this image display device.

DESCRIPTION OF THE PREFERRED EMBODIMENTS

The video game device 100 according to one embodiment of the present invention reads game programs and data stored on a storage medium, such as an optical disk, or the like, and outputs images and sounds to players. The player inputs commands via a controller.

Figure 1:
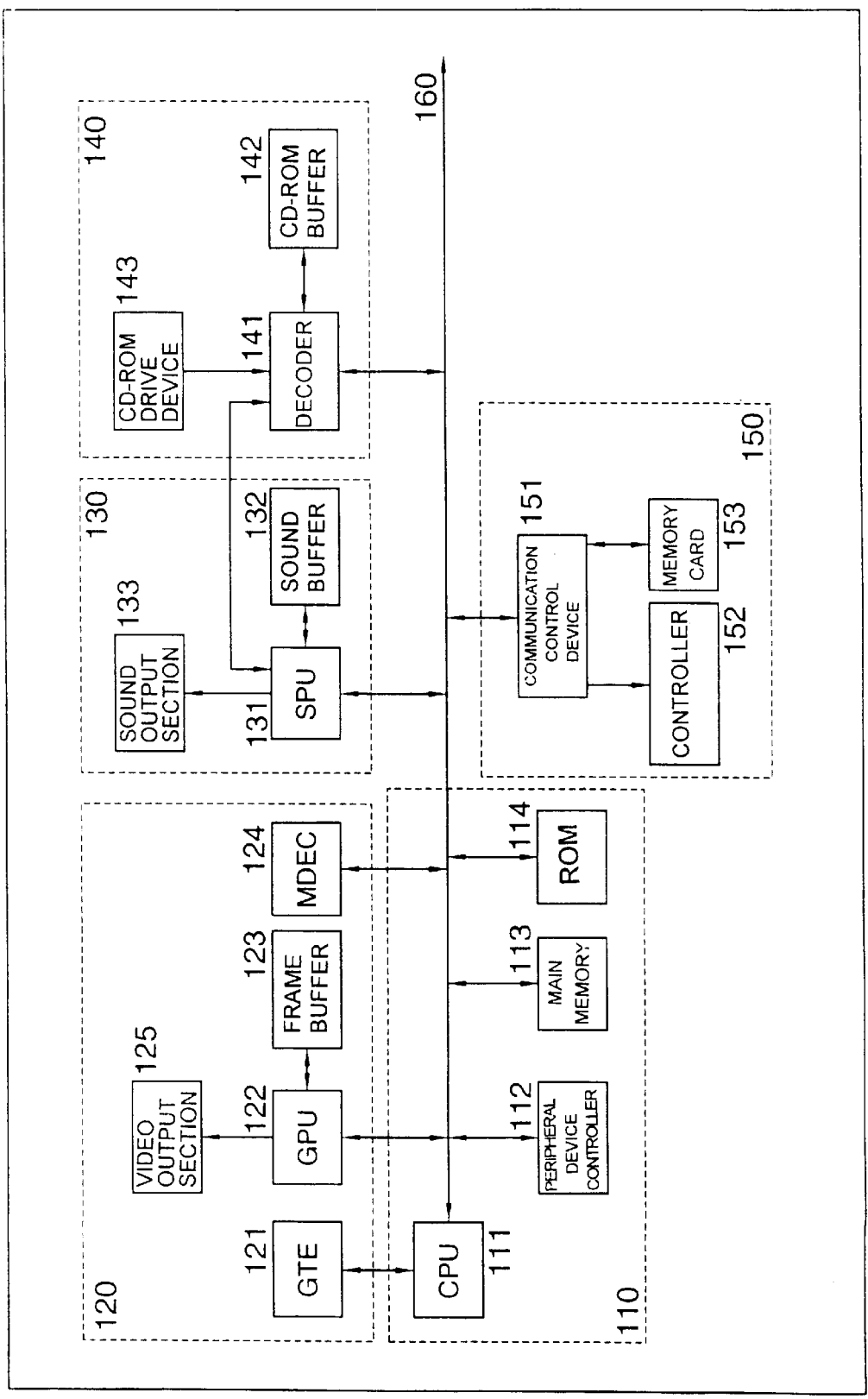
FIG. 1 is a functional block diagram of a video game device 100.

The general composition of the video game device 100 is now described with reference to FIG. 1. This video game device 100 comprises: a control section 110 for controlling the operation of the device as a whole; an image processing section 120 for conducting processing relating to image display; a sound processing section 130 for conducting processing relating to sound output; an external memory control section 140 for reading out game programs and various data from a storage medium; a communication control section 150 for controlling reading and writing of data, such as commands from the players, game settings and game progress status, etc., and controlling input and output of other data; and a main bus 160 which connects the foregoing control section 110 to the communication control section 150.

Next, the internal composition of the device from the control section 110 to the communication control section 150 is described.

The control section 110 comprises: a CPU 111, a peripheral device controller 112 for performing operations such as interrupt control, time control, memory control, and direct memory access (DMA) transfer, and the like; a main memory 113; and a ROM 114 for storing a program, such as an operating system (OS), for controlling the main memory 113, the image processing section 120, the sound processing section 130, and the like. The CPU 111 controls the device as a whole by executing the OS stored in the ROM 114. Furthermore, the CPU 111 has a built-in command cache and scratch pad memory, and also controls the actual memory.

The image processing section 120 comprises: a geometry transfer engine (GTE) 121 consisting of a co-ordinates calculating co-processor for carrying out processing, such as co-ordinates conversion, and the like; a graphics processing unit (GPU) 122 for drawing in accordance with drawing commands from the CPU 111; a frame buffer 123 for storing images drawn by the GPU 122; an image decoder (MDEC) 124 for decoding image data which has undergone orthogonal conversion, such as so-called discrete cosine transform, and has then been compressed and encoded; and a video output section 125, such as a display device, or the like.

The sound processing section 130 comprises: a sound processing unit (SPU) 131 for generating sounds; a sound buffer 132 for storing sound source data, and data such as sound and music data read out from a CD-ROM; and a sound output section 133, such as an amplifier and speaker, or the like, for outputting sound generated by the SPU 131.

The external memory control device 140 comprises: a CD-ROM drive device 143 for reproducing programs, data, and the like, recorded on a CD-ROM disk; a decoder for decoding programs, data, and the like, which has been recorded with an appended error correction (EC) code, for example; and a CD ROM buffer 142 which temporarily stores reproduced data from the CD-ROM drive device 143.

The communication control section 150 comprises: a communication control device 151 for controlling communications with the CPU 111 via a main bus 160; a controller 152 for inputting commands from a user; and a memory card 153, which is a readable and writeable storage medium for storing game settings, and the like.

Next, the general operation of the video game device 100 is described.

When the power source of the video game device 100 is turned on, the OS stored in the ROM 114 is executed by the CPU 111, and the image processing section 120, sound processing section 130, and the like enter under the control of the OS. Firstly, the OS executes initialization of the whole device, such as operation verification processing, whereupon it controls the external memory control section 140 and executes a game program recorded on the CD-ROM housed in the CD-ROM drive device 143. Thereupon, the CPU 111 controls the image processing section 120, the sound processing section 130, and the like, in accordance with the game program being executed and inputs made by the player via the controller 152, and it displays images by means of the video output section 125, as well as outputting sounds, such as sound effects, music, and the like, by means of the sound output section 133. If a game is interrupted temporarily, the state of progress of the game is written to the memory card 153 as saved data. When the interrupted game is restarted, the state of the game in progress is recreated by reading out this saved data.

Next, the operation of a game program relating to the present invention, as executed by the video game device 100, is described. In this game, events occurring with relation to a male main character performing actions in an imaginary world, and female secondary characters sharing the actions of the main character, are displayed to the player by means of images and sounds. The player deals with these events by controlling the main and auxiliary characters using the controller 152.

The main character is the representative of the player in the game world. It acts by receiving commands directly from the player. The secondary characters, on the other hand, whilst sharing the actions of the main character, are not controlled directly by commands from the player, but rather their behaviour is designated by a specific game program.

The characters have a plurality of state display parameters. These include parameters representing the strength of various capabilities possessed by the characters, such as offensive ability, defensive ability, intelligence, charisma, etc., and parameters representing physical and psychological states of the character, such as the levels of physical and mental fatigue, amount of damage sustained, etc. These parameters are used, either independently or in combination, when deciding the success or failure of an action performed by the character, or determining the occurrence of an event and the outcome thereof. The secondary characters have state display parameters expressing the strength of goodwill that they feel for the main character. This level of goodwill is affected by the selection of actions that the main character instructs the secondary characters to perform, and there exist certain actions which can only be selected if this level of goodwill is at or above a prescribed value. Furthermore, parameter correction values are previously set for different items of equipment, respectively, and these state display parameters are corrected according to the items of equipment being carried by the character. Therefore, the player changes the items of equipment as appropriate, in response to the development of the game.

Figure 2:
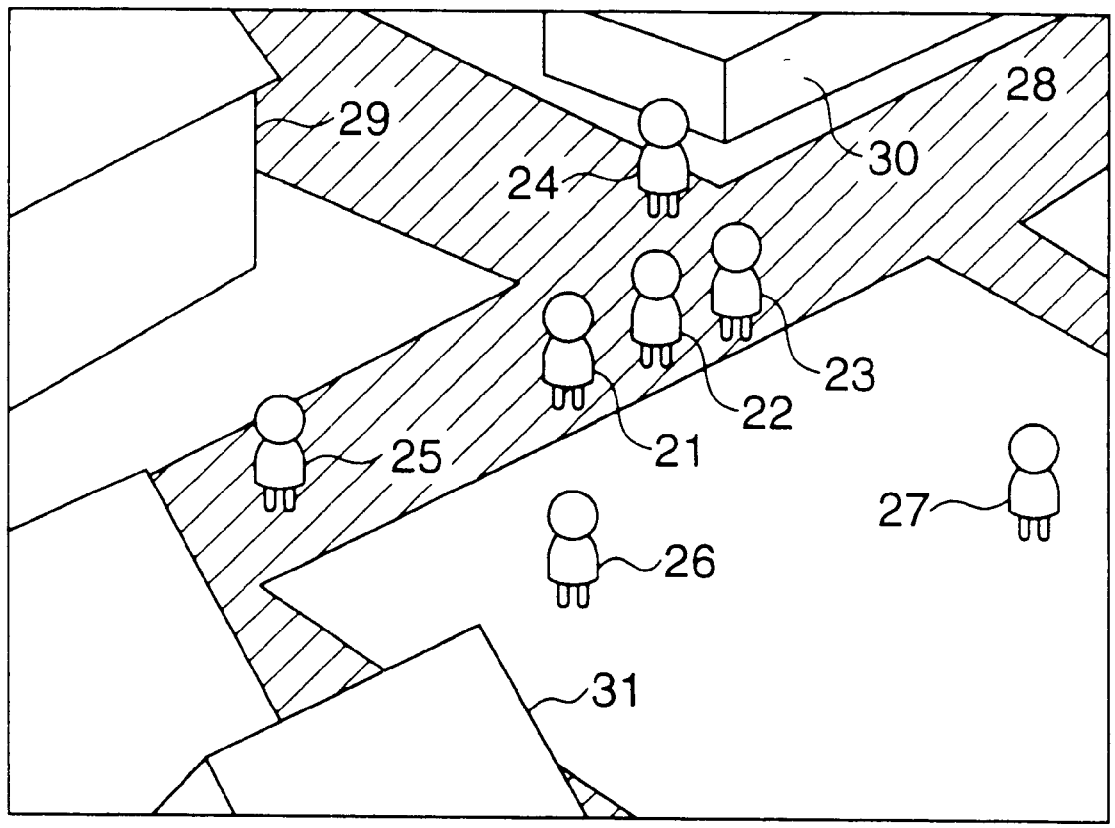
FIG. 2 is an example of a street movement screen.

FIG. 2 is an example of a street movement screen displayed by the video output section 125 as one scene of the present game. This street movement screen is a screen displaying the main character and secondary characters moving through a town, as viewed from above looking downwards in an oblique direction. The portion of the screen shaded diagonally from bottom left to top right is a street 28, which is surrounded by various buildings 29, 30, 31. The main character 21 and two secondary characters 22 and 23 are walking along the street 28 and move through the town in accordance with operations performed by the user via the controller 152. Characters 24–27 are operated automatically by the game program.

Figure 3:
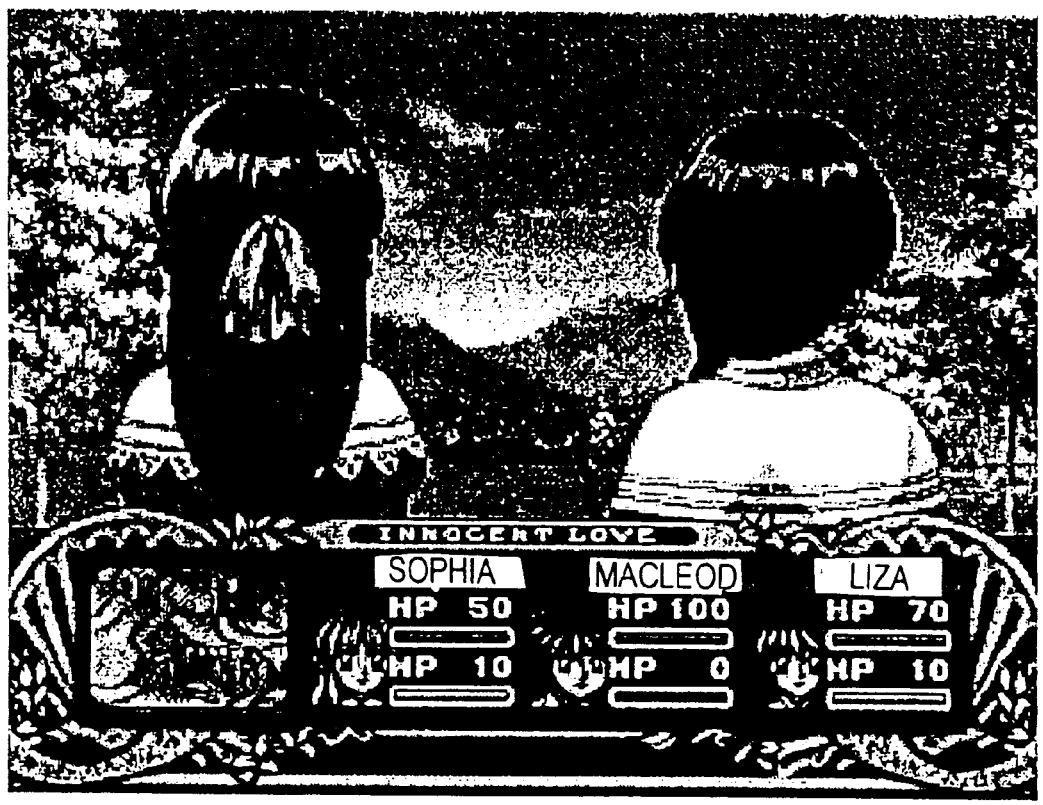
FIG. 3 is an example of a town-to-town movement screen.
Figure 4:
FIG. 4 is an example of a town-to-town movement screen.

If the game characters are moving between two towns, a town-to-town movement screen like that shown in FIG. 3 is displayed. In this diagram, the rear forms of two secondary characters are depicted. This screen represents the field of vision of the main character when walking behind the secondary characters. If the player carries out prescribed operations using the controller 152, then a state where the secondary characters turn around and look towards the main character can be displayed. A screen relating to this case is depicted in FIG. 4.

Below, a description is given of the operations performed by the player and screens that are depicted when the player attempts to change the clothes of a secondary character. At the screen displayed in FIG. 2, the player operates a prescribed button on the controller 152. By so doing, a command selection screen is displayed. This command selection screen displays various options, such as "status" (for displaying the physical state, or the like, of the main and secondary characters), "magic" (for displaying a list of magic already learnt by the main and secondary characters, and a list of magic that can be used currently), "tools" (for displaying a list of items that are currently in the possession of the main and secondary characters), "equipment" (for changing the items of equipment used by the main and secondary characters), "album" (for saving the state of the game as image data, and displaying saved data), and "environment settings" (for setting the playing environment for the game). The player selects "equipment" from this list of commands by moving a cursor by means of the controller 152.

When the player selects "equipment", a character selection screen appears. The character selection screen is a screen for displaying a list of the names of the main and secondary characters, as options, and it displays upper body images of the secondary characters. The player moves the cursor using the controller 152, and selects the name of one of the characters.

Figure 5:
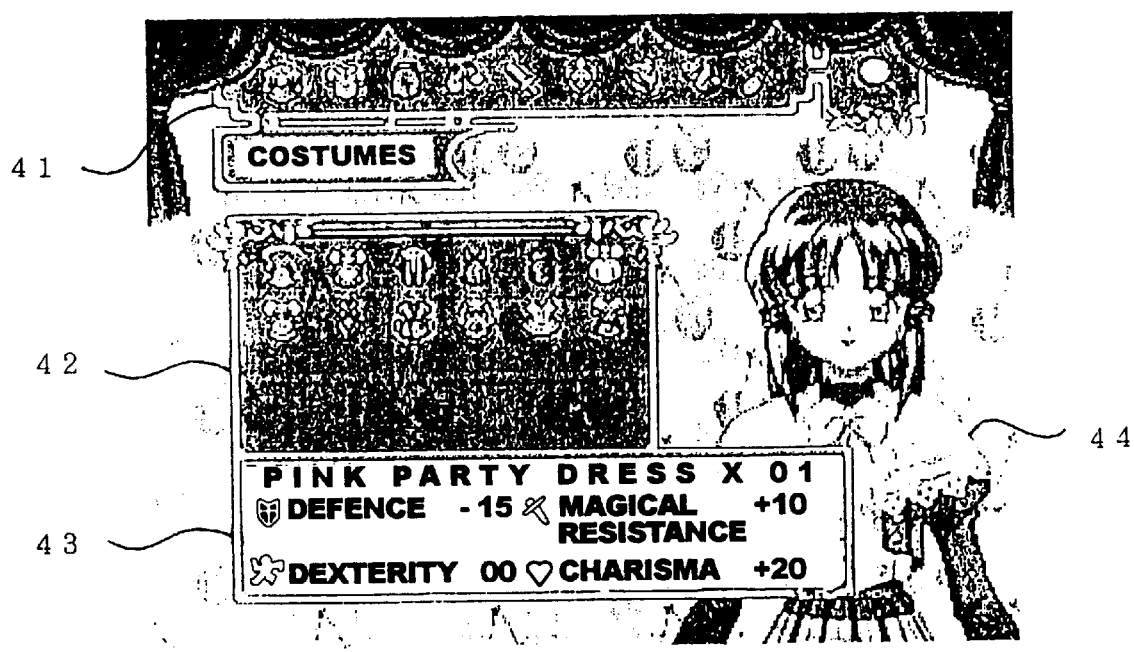
FIG. 5 is an example of an equipment selection screen.
Figure 6:
FIG. 6 is an example of item image data.
Figure 6:
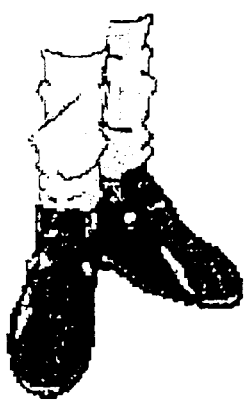
Figure 7:
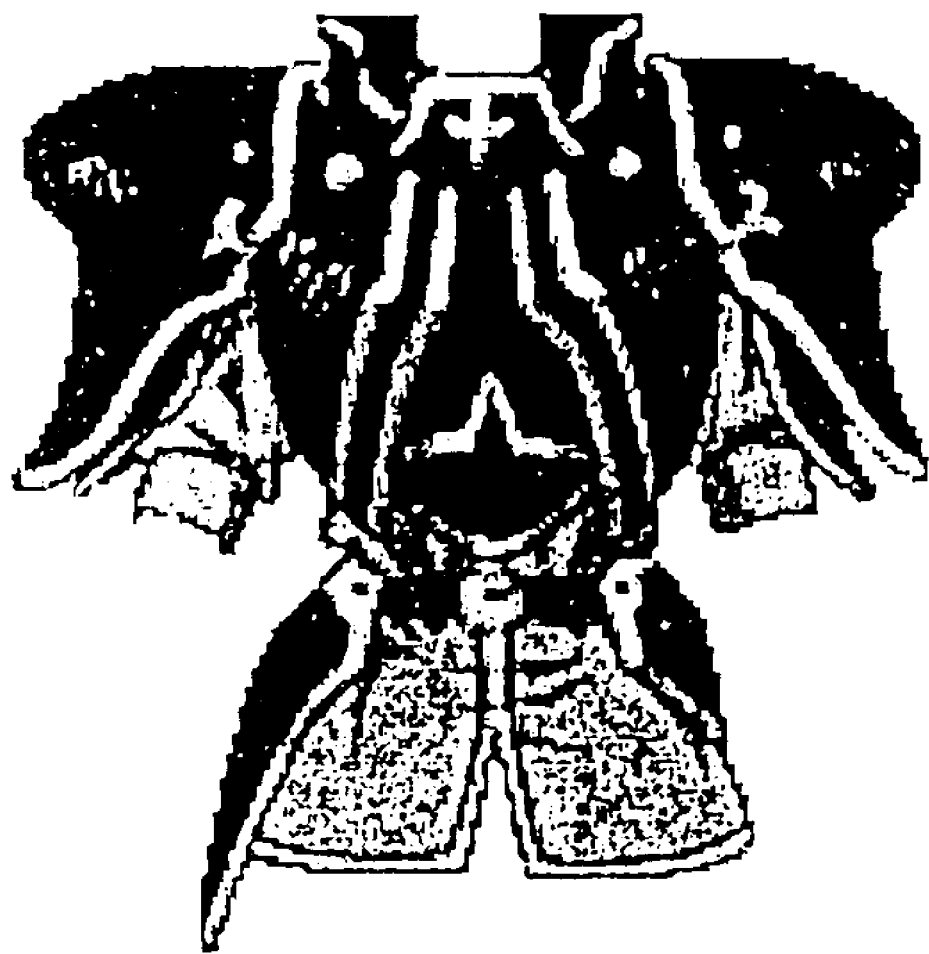
FIG. 7 is an example of item image data.
Figure 8:
FIG. 8 is an example of item image data.
Figure 9:
FIG. 9 is an example of item image data.
Figure 10:
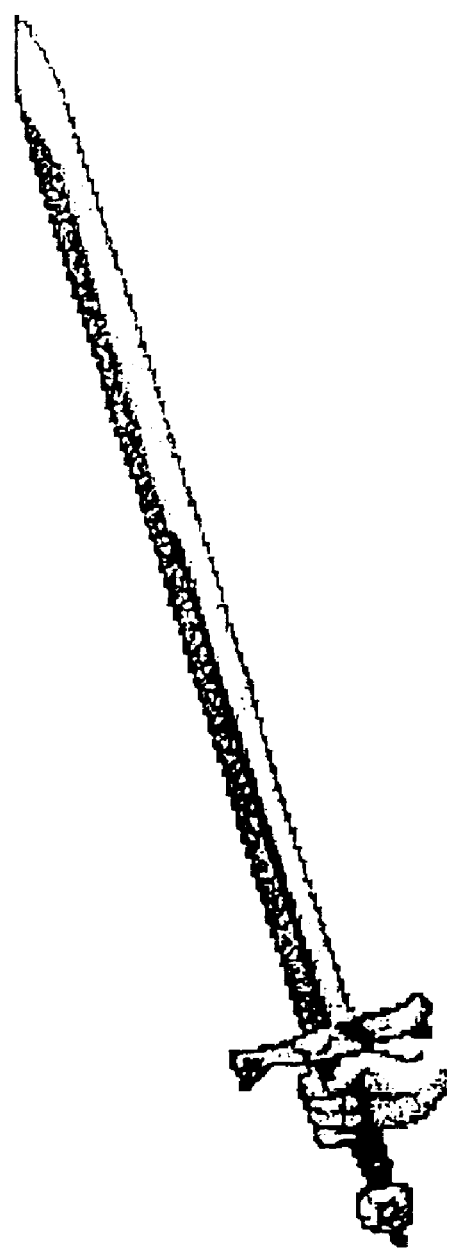
FIG. 10 is an example of item image data.
Figure 11:
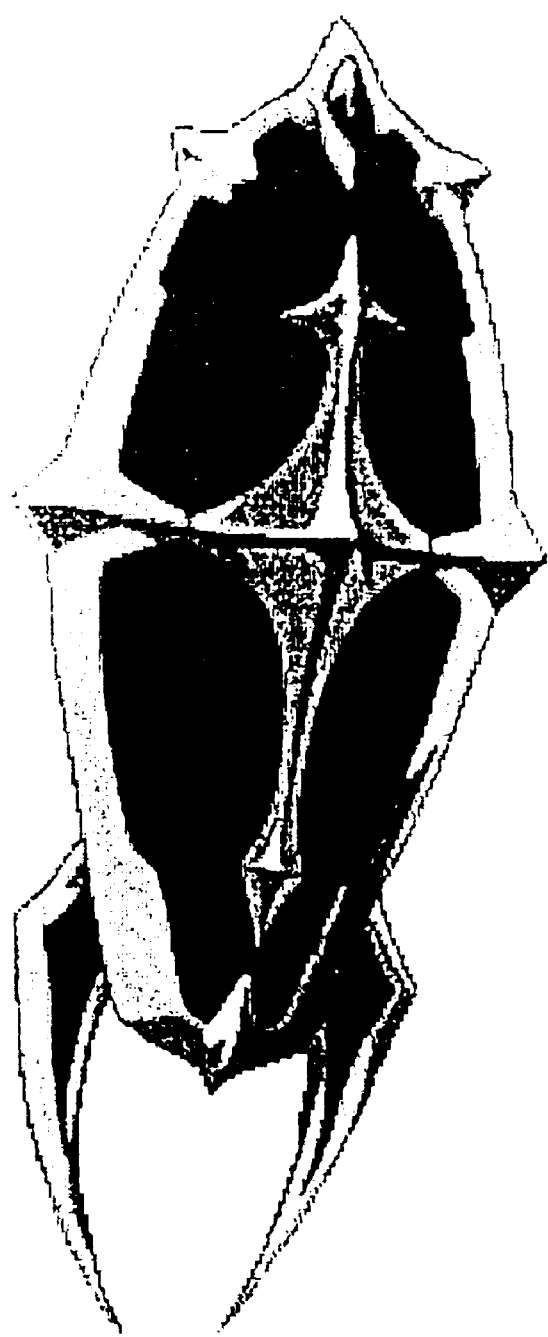
FIG. 11 is an example of item image data.

When a character has been selected, an equipment selection screen, such as that shown on FIG. 5, is displayed. This equipment selection screen comprises a category display window 41, an equipment possession display window 42 and an item of equipment description window 43, at the top, middle and bottom of the screen, respectively, as well as a character display section 44 on the right-hand side of the screen, for displaying the character carrying or wearing items of equipment, and a background screen which reflects the psychological state of the character at the point in time that the equipment selection screen was displayed.

The category display window 41 is a window that displays icons for options representing different categories of equipment, depending on the part of the body where the item of equipment is to be carried or worn. In FIG. 5, different equipment category icons for costumes, upper body items, lower body items, shoes, weapons, shields, bracelets, rings, and ornaments are displayed, in this order from the left-hand side of the window. The player moves the cursor within the window by operating the controller 152, to select one of the equipment category icons. By so doing, an equipment possession display window corresponding to the selected icon is displayed. The magnifying glass icon on the right-hand edge of the window is an icon for transferring to the equipment display screen, which is described hereinafter.

The equipment possession display window 42 shows a list of the items belonging to the selected category which are in the character's possession. For example, if "shoes" is selected in the category display window 41, then a list of equipment item icons belonging to the "shoes" category, such as "ballet shoes", "sandals", "high heels", "boots", or the like, is displayed. Also, as the cursor is moved within the equipment possession display window 42, the parameter correction value for the item of equipment currently selected by the cursor is displayed in the item of equipment description window 43. Therefore, the player is able to decide the items of equipment for a character whilst looking at the corresponding parameter correction value displayed in the item of equipment description window. Furthermore, the item of equipment icons displayed in the equipment possession display window 42 are linked respectively to item of equipment display data. FIGS. 6–11 are examples of item image data, which relate to items of equipment categorized respectively into costumes, upper body items, lower body items, shoes, weapons, and ornaments.

Figure 13:
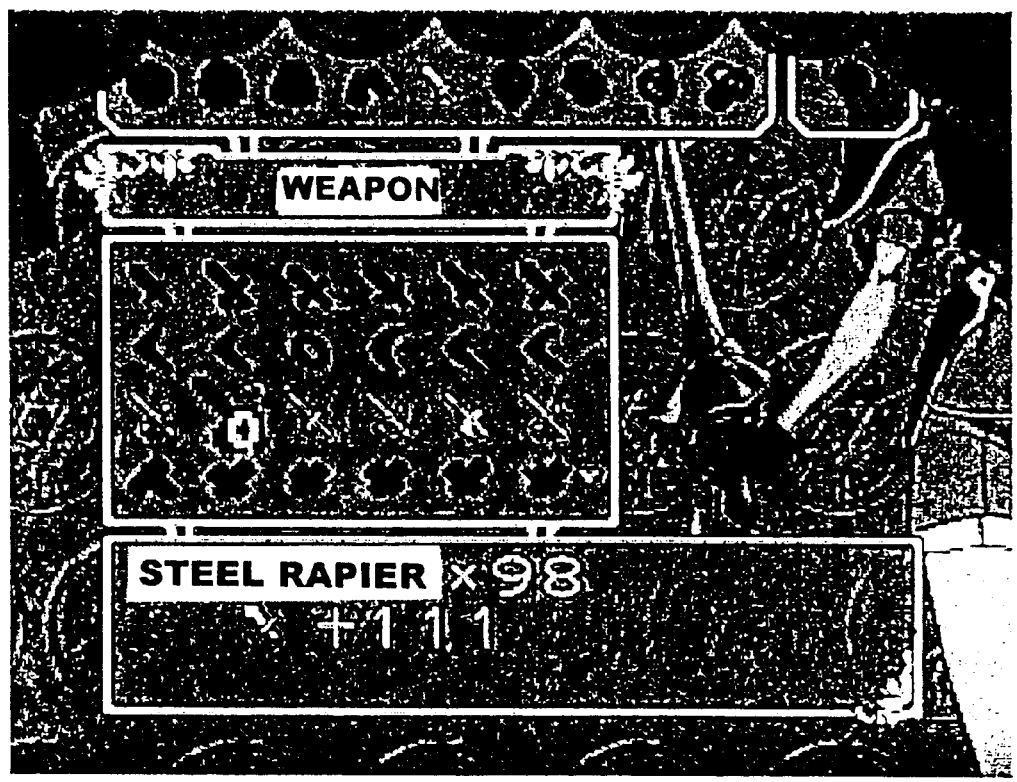
FIG. 13 is an example of an equipment changing screen.
Figure 14:
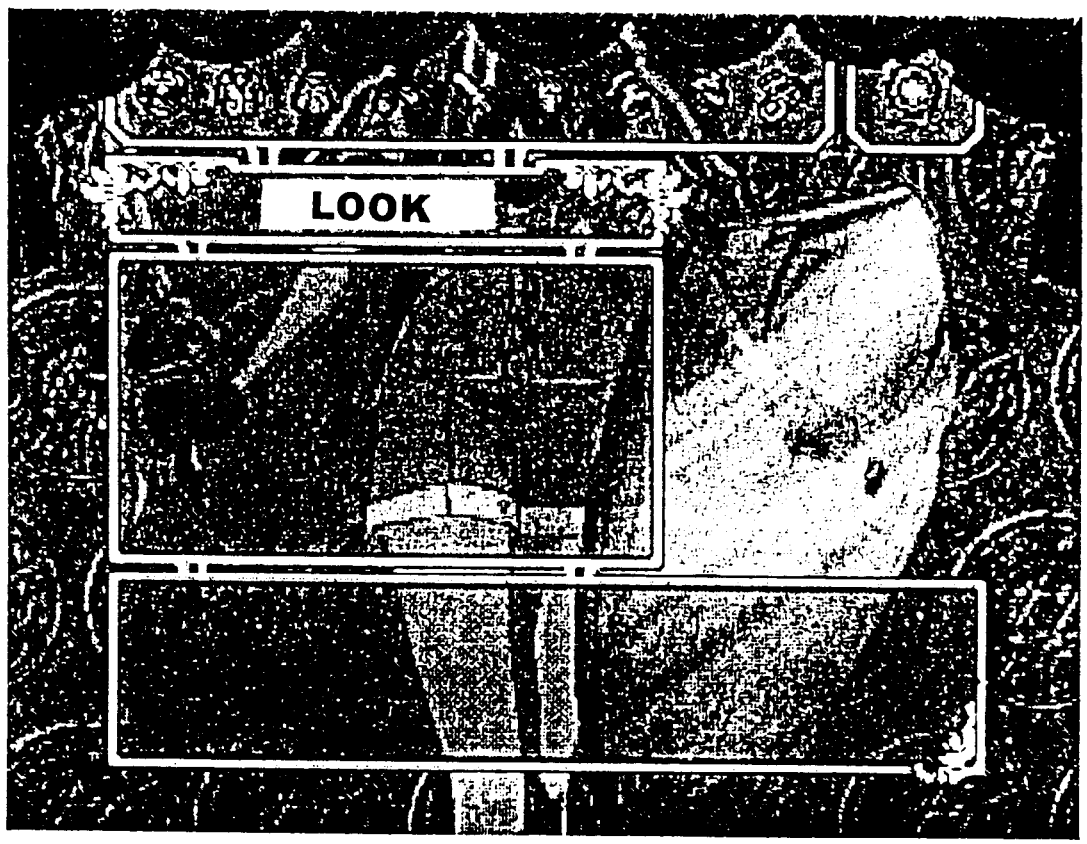
FIG. 14 is an example of an equipment changing screen.

Next, changes made in the equipment changing screen are described with reference to FIGS. 12–14 which are separate equipment changing screens to FIG. 5.

Figure 12:
FIG. 12 is an example of an equipment changing screen.

FIG. 12 shows a state immediately after a weapon icon has been selected on the category display window 41. A list of weapons currently in the possession of the character is displayed in the equipment possession display window 42. Furthermore, the item of equipment description window 43 shows which weapons are currently carried or worn by the character.

When the weapons icon is selected in the category display window 41, the cursor moves to the equipment possession display window 42. When the cursor is moved, the parameter correction value for the selected weapon is displayed in the item of equipment description window 43. Since, here, the cursor in the equipment possession display window 42 is located over "steel rapier", the parameter correction value relating to "steel rapier" is displayed in the item of equipment description window 43.

Figure 15:
FIG. 15 is an example of a town-to-town movement screen.

If the item of equipment held by the character is changed by moving the cursor inside this screen, then the item of equipment carried or worn by the character displayed in the display section 44, town-to-town movement screen, or item of equipment display screen, also changes accordingly. An example of this type of change can be seen by comparing the right-hand one of the two secondary characters depicted in the town-to-town movement screens in FIG. 14 and FIG. 15.

The equipment changing screen changes in this manner if one of the costume-ornament icons is selected in the category display window 41. However, if the magnifying glass icon at the right-hand edge of the category display window 41 is selected, then, as shown in FIG. 14, nothing is displayed in the equipment possession display window 42 and the item of equipment description window 43. When the magnifying glass icon is selected, the display transfers to the equipment display screen.

Figure 16:
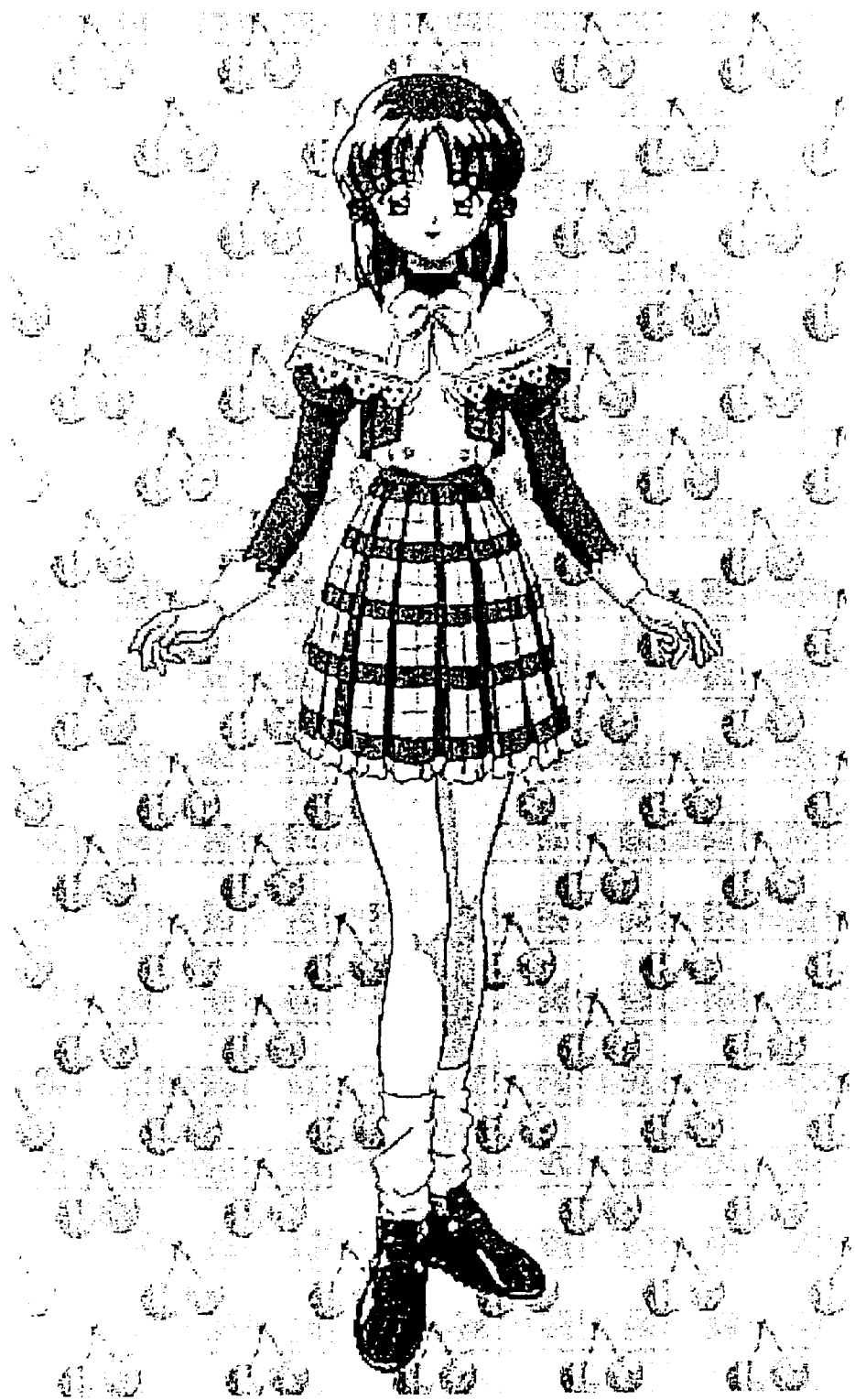
FIG. 16 is an example of an equipment display screen.
Figure 17:
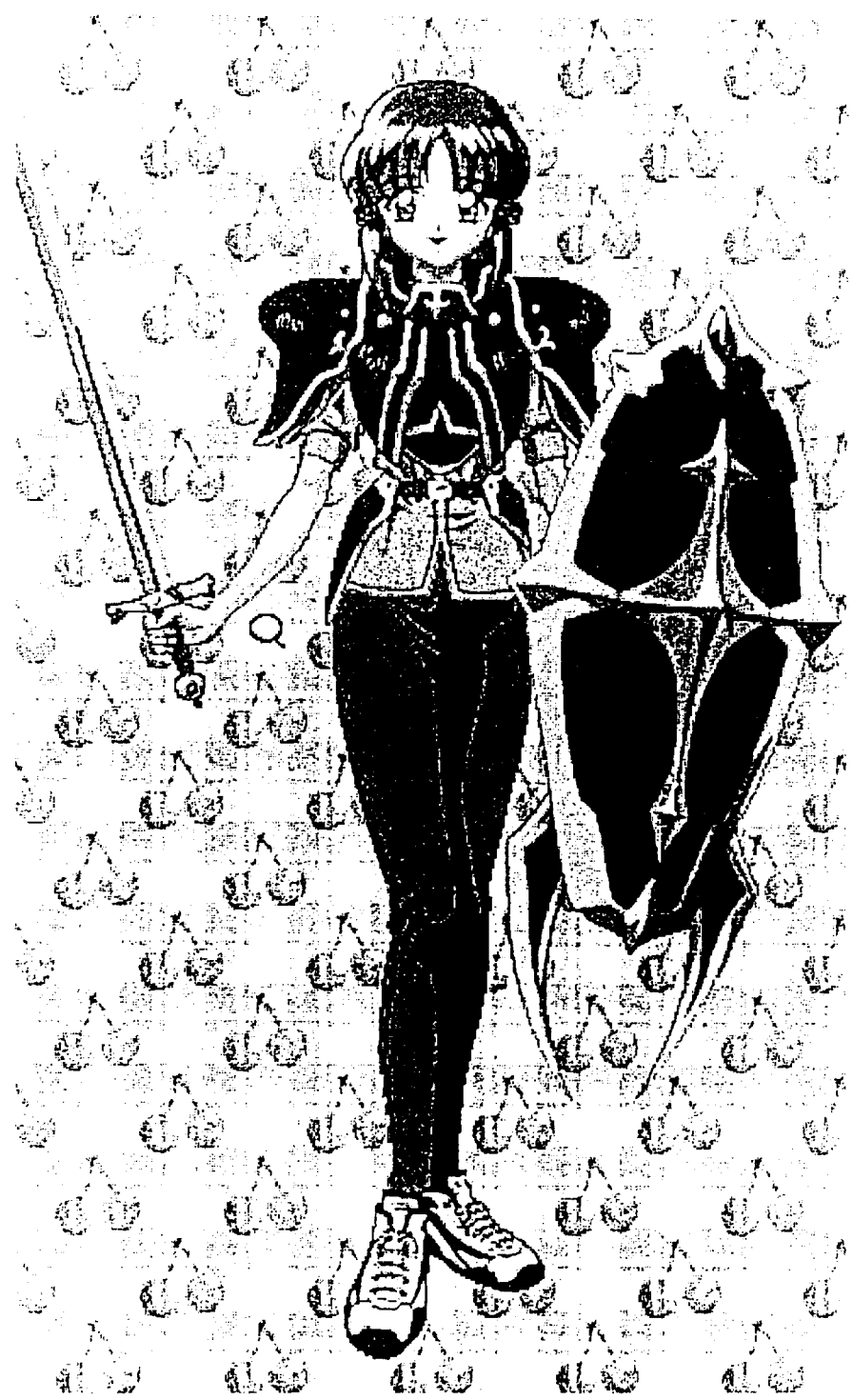
FIG. 17 is an example of an equipment display screen.
Figure 18:
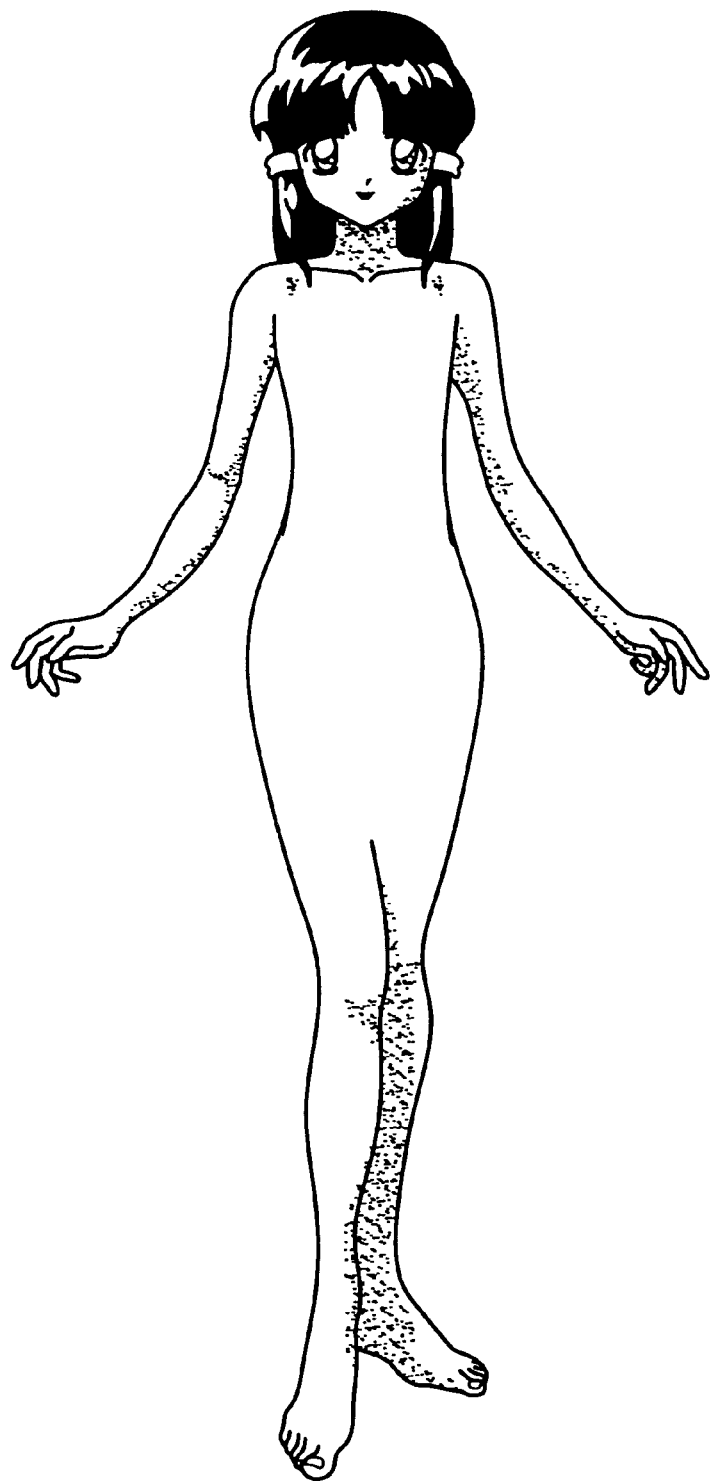
FIG. 18 is an example of naked body image data.

The equipment display screen is a screen which shows the full body of the character along with the items of equipment currently worn or carried by the character. FIG. 16 and FIG. 17 are examples of equipment display screens. FIG. 16 is an image created by superimposing the item image data in FIG. 6 and the background pattern image data onto the naked body image data in FIG. 18. Similarly, FIG. 17 is a composite image created by superimposing the item image data in FIGS. 7–11 and background pattern image data onto the naked body image data in FIG. 18.

Figure 19:
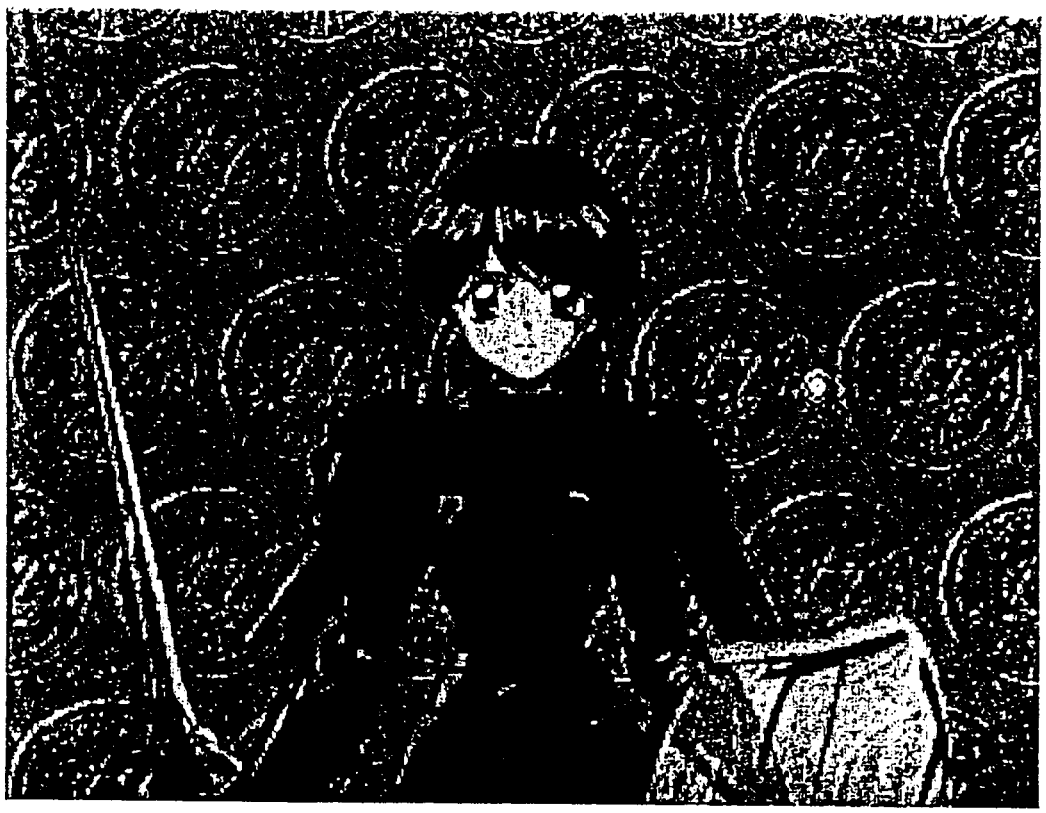
FIG. 19 is an example of a scrolling display of a composite image.
Figure 20:
FIG. 20 is an example of a scrolling display of a composite image.
Figure 21:
FIG. 21 is an example of a scrolling display of a composite image.
Figure 22:
FIG. 22 is an example of an enlarged display of a composite image.

A composite image created in this way can also be displayed such that it is contained within the screen size of the video output section 125. However, by adopting a display of this kind, the whole image of the human character which is longer in the vertical dimension will be displayed in a screen which is longer in the horizontal dimension, resulting in a small character display, which does not allow detailed portions of the image to be depicted. Therefore, in this game, the horizontal length of the composite image is matched to the horizontal length of the screen of the video output section 125. By so doing, a portion where the image cannot be displayed is created at the top and bottom of the composite image, but as can be seen in FIGS. 19–21, this problem is resolved by enabling the display position to be changed by scrolling the image upwards and downwards by means of a controller 152. Moreover, the display can also be enlarged by operating the controller 152, as illustrated in FIG. 22.

In the screens in FIG. 19–FIG. 22, the player is able to move a cursor representing the direction of the line of sight of the main character, thereby determining which part of the secondary character the main character is focusing on. The various body parts of the characters and the various items of equipment contain previously recorded messages based on sound or text, and when the player indicates a focus point, a message is output from the video output section 125 or the sound output section 133, to represent the reaction of the secondary character. In this way, it is possible to convey to the player the feelings of a secondary character with respect to the item of equipment that the main character is looking at.

As described above, changes in the items of equipment by means of the equipment selection screen also affect the character display in the character display section 44 and town-to-town movement screens, and these displays are implemented in a similar manner to the character display in the equipment display screen described here.

Changes in the appearance image of a character due to changes in the items of equipment in this way are shown to the player via the video output section 125. At the same time, changing the items of equipment means that the correctional values for the state display parameters of the character change also. In particular, as described above, a secondary character has a goodwill level as one of its state display parameters, and this goodwill level is affected significantly by the items of equipment selected by the main character (in other words, by the player). Table 1 is a portion of a table showing items of equipment and the corresponding correctional values to the goodwill levels of five different characters C1, C2, C3, C4, C5, when they carry or wear this item of equipment. This table shows a portion of a record containing correctional values for items of equipment that correspond to the "costume" category of equipment. Although not shown in the diagram, records for items of equipment in the categories of upper body items, lower body items, shoes, weapons, and ornaments are also provided. The goodwill level is affected by the words and actions of the secondary character with respect to the main character. Furthermore, a plurality of background images, such as equipment display screens, and the like, are prepared for each secondary character, in such a manner that the background changes depending on the level of goodwill.

acter is created individually for each item of equipment carried or worn by the character.

| Category | Character | Name of equipment item | No. times | C1 | C2 | C3 | C4 | C5 |
|---|---|---|---|---|---|---|---|---|
| Costumes | C1 only | Uniform 1 | All | | | | | |
| | | Bathing costume A1 | 1 | -12 | | | | |
| | | Bathing costume B1 | 2 | -15 | | | | |
| | C2 only | Uniform 2 | All | | | | | |
| | | Bathing costume A2 | 1 | | +15 | | | |
| | | Bathing costume B2 | 2 | | +12 | | | |
| | C3 only | Uniform 3 | All | | | | | |
| | | Bathing costume A3 | 1 | | | -10 | | |
| | | Bathing costume B3 | 2 | | | -10 | | |
| | C4 only | Uniform 4 | all | | | | | |
| | | Bathing costume A4 | 1 | | | | -9 | |
| | | Bathing costume B4 | 2 | | | | -12 | |
| | C5 only | Uniform 5 | all | | | | | |
| | | Bathing costume A5 | 1 | | | | | -8 |
| | | Bathing costume B5 | 2 | | | | | -15 |
| | All | Suit | All | +2 | +3 | 0 | 0 | 0 |
| | | Dress | 1 | +15 | -9 | -6 | -9 | -15 |
| | | Robe | 2 | +9 | -9 | -6 | -12 | +6 |

As described above, the items of equipment are categorized into costumes, upper body items, lower body items, shoes, weapons, and ornaments, but separately from these categories, a broad distinction is also made between items of equipment that are for the specific use of particular characters, and items of equipment that can be used by all characters. In Table 1, the items of equipment marked as "C1–C5 only" in the second column, "Character", are items of equipment which can only be used by the characters C1–5, respectively, and independent item image data is used for each item of equipment. On the other hand, the items of equipment marked "All" are items of equipment that can be used by all of the characters, C1–5, and common data is used for the item image data. However, the correctional values are determined independently for each character. This represents the fact that each secondary character has a different taste in clothes, and therefore each character is affected differently by the same item of equipment.

The fourth column in Table 1 shows the number of times the player has cleared the game. When the game is cleared, the number of times that the game has been cleared is recorded as data in the memory card 153. When the player starts up the video game device 100 and loads saved data, the game program refers to the fourth column of Table 1 to find the number of times the game has been cleared. If the "No. of times" indicates "All", then the corresponding item of equipment can appear in the game, regardless of the number of times the game has been cleared. If the "No. of times" indicates "1" or "2", then that item of equipment only appears in games where the number of times the game has been cleared is an odd number or an even number, respectively.

According to the present invention, since the appearance image of a character is displayed by composing a naked body image and item of equipment images, the appearance image of the character can be displayed according to the items of equipment that the character is carrying or wearing. The naked body image may be called a reference character image data because the other items are worn or carried by the naked body.

Furthermore, the burden of image creation is reduced compared to cases where the appearance image of a char- Furthermore, characters have psychological parameters and correctional values for these psychological parameters for each item of equipment. Therefore, it is possible to impart to a character the psychological effects induced by an item of equipment when worn or carried by an actual human being. Consequently, it is also possible to improve the characteristics of the game by restricting the actions that the player can command the character to perform, accordingly. Moreover, since the respective secondary characters have their own individual preferences with regard to items of equipment, the choice of items of equipment for them significantly affects their level of goodwill towards the main character, and this in turn affects the player's choices in the game, and therefore the player must decide upon items of equipment by taking account of the secondary character's preferences, rather than just the player's own preferences.

In the foregoing, the present invention was described on the basis of an embodiment, but the present invention is not limited to this embodiment, and it may of course be modified or improved within the scope of common knowledge of people working in this field.

What is claimed is:

1. A software product comprising: an image display program to be executed by a processing unit in cooperation with a display device for displaying an appearance image of a character; reference character image data representative of a reference state image of said character free from any item; and item image data representative of images of items to be equipped by said character, said image display program comprising the processes of:
selecting said at least one item from the item image data;
creating a new image data, by said processing unit, based on said reference character image data and at least one item image data selected; and
displaying created image data as said appearance image on said image display device, wherein:
said character has a set of numeral values each of which depends on a specific attribute of said character;
said item has correctional values for modifying the numeral value set;

the software product comprises a video game program to be executed by the processing unit;
actions of the character in the video game are commanded by an input device cooperating with said processing unit;
a player of the video game is aimed to meet the condition representing the end of the game to play said video game program; and
said correctional values depend on the number of times that said condition is met.

2. A method for displaying, on an image display device operatively coupled to a processing unit, an appearance image of a character equipped with at least one item, comprising:
preparing reference character image data representative of a reference state image of said character free from any item and item image data representative of images of items to be equipped by said character;
selecting said at least one item from the item image data;
creating a new image data, by said processing unit, based on said reference character image data and at least one item image data selected; and
displaying created image data as said appearance image on said image display device, wherein:
said character has a set of numeral values each of which depends on a specific attribute of said character;
said item has correctional values for modifying the numeral value set;
said character is of the video game program in which action of the character are commanded by an input device cooperating with said processing unit,
said video game program in which a player of a game is aimed to meet the condition representing the end of the game to play said video game program; and
said correctional values depend on the number of times that said condition is met.

3. A method for displaying, on an image display device operatively coupled to a processing unit, an appearance image of a character equipped with at least one item, comprising:
preparing reference character image data representative of a reference state image of said character free from any item and item image data representative of images of items to be equipped by said character;
selecting said at least one item from the item image data;
creating a new image data, by said processing unit, based on said reference character image data and at least one item image data selected; and
displaying created image data as said appearance image on said image display device, wherein:
said character is of the video game program which is executed by said processing unit and in which actions of the character are commanded by an input device cooperating with said processing unit;
said preparing step prepares sound source data each of which is linked to a part of said appearance image of said character; and
said displaying step comprises:
accepting a designation of a portion of the created image data displayed in said displaying step by said input device; and
reproducing the sound source data linked to the designated portion.

4. An image display program to be executed by a processing unit in cooperation with a display device for displaying an image of an appearance image of a character, wherein:
said character has a set of numeral values each of which depends on a specific attribute of said character;
at least one of said numeral values is representative of strength of goodwill that said character feel for another character; and
said items having correctional values for modifying the numeral set, wherein said image display program includes a plurality of process executable by said processing unit to effect a display devise, including:
a preparing process of preparing reference character image data representative of a reference state image of said character free from any item and item image data representative of image of items to be equipped by said character;
a selecting process of selecting said at least one item from the item data according to an instruction from another character;
a creating process of creating a new image data based on said reference character image data and at least one item image selected;
a modifying said numeral value into a modified value that represents strength of the goodwill on the basis of said corrected value of said selected items; and
a displaying process of displaying on said display devise created image data as said appearance image.

5. A program as claimed in claim 4, wherein said reference character image data which shows the whole body of said character is divided into a plurality of part image data each of which shows a part of body of said character.

6. A program as claimed in claim 4, further comprising:
a process of designating a portion of the created image data displayed in said displaying process; and
a process of displaying the enlarged image of said portion on the image display device.

7. A program as claimed in claim 4, wherein said correctional values are determined for said character.

8. A program, as claimed in claim 4, for displaying, on an image display device, appearance images of a plurality of characters each of which equipped with at least one item, wherein each of said characters is displayed by said program.

9. A program as claimed in claim 4, wherein said correctional values are varied at each of characters.

10. A software product comprising an image display program to be executed by a processing unit in cooperation with a display device for displaying an appearance image of a character, wherein:
said character has a set of numeral values of which depends on a specific attribute of said character;
said item has correctional values for modifying the numeral value set;
said set of numeral values is grouped into a subset of numeral values each of which is indicative to a psychological parameter related to a psychological condition of said character;
the software product comprises reference character image data representative of a reference state image of said character free from any item, item image data representative of images of items to be equipped by said character, and a plurality of background image data;
the image display program comprises the processes of:
selecting said at least one item from the item image data;
creating a new image data based on said reference character image data and at least one item image data selected; and displaying created image data as said appearance image and selected one of said background image data in accordance with said psychological parameter.

11. A method for displaying, on an image display device operatively coupled to a processing unit, an appearance image of a character equipped with at least one item, wherein:

said character has a set of numeral values of which depends on a specific attribute of said character;

said item has correctional values for modifying the numeral value set; and said set of numeral values is grouped into a subset of numeral values each of which is indicative to a psychological parameter related to a psychological condition of said character, the method comprising:

preparing reference character image data representative of a reference state image of said character free from any item, item image data representative of images of items to be equipped by said character, and a plurality of background image data;

selecting said at least one item from the item image data;

creating a new image data, by said processing unit, based on said reference character image data and at least one item image data selected; and displaying created image data, on said image display device, as said appearance image and selected one of said background image data in accordance with said psychological parameter.

12. A software product comprising: an image display program to be executed by a processing unit in cooperation with a display device for displaying an appearance image of a character; reference character image data representative of a reference state image of said character free from any item; and item image data representative of images of items to be equipped by said character, said image display program comprising the processes of:

selecting said at least one item from the item image data;

creating a new image data, by said processing unit, based on said reference character image data and at least one item image data selected; and displaying created image data as said appearance image on said image display device, wherein:

the software product comprises a video game program to be executed by the processing unit and sound source data each of which is linked to a part of said appearance image of said character;

said character is of the video game program;

actions of the character in the video game are commanded by an input device cooperating with said processing unit;

said displaying process comprises the processes of:

accepting a designation of a portion of the created image data displayed in said displaying process by said input device; and reproducing the sound source data linked to the designated portion.

13. An image display program, executable by a processing unit in cooperation with a display device for displaying an image of an appearance image of a character, wherein:

said character has a set of numeral values each of which depends on a specific attribute of said character;

at least one of said numeral values is representative of strength of goodwill that said character feel for another character; and said item having correctional values for modifying the numeral value set, wherein said image display program has a plurality of processes executable on said processing unit including:

a preparing process of preparing reference character image data representative of a reference state image of said character free from any item and item image data representative of images of items to be equipped by said character;

a selecting process of selecting said at least one item from the item image data according to an instruction from another character;

a creating process of creating a new image data based on said reference character image data and at least one item image data selected;

a modifying step of modifying said numeral value into a modified value that represents strength of the goodwill on the basis of said corrected value of said selected items; and a displaying process of displaying created image data as said appearance image.

14. A program as claimed in claim 13, wherein said reference character image data which shows the whole body of said character is divided into a plurality of part image data each of which shows a part of body of said character.

15. A program as claimed in claim 13, further comprising:

a process of designating a portion of the created image data displayed in said displaying process; and a process of displaying the enlarged image of said portion on the image display device.

16. A program as claimed in claim 13, wherein said correctional values are determined for said character.

17. A program as claimed in claim 13, for displaying, on an image display device, appearance images of a plurality of characters each of which equipped with at least one item, wherein each of said characters is displayed by said program.

18. A program as claimed in claim 13, wherein said correctional values are varied at each of characters.

* * * * *